United States Patent [19]

Giordano et al.

[11] Patent Number: 5,126,043

[45] Date of Patent: Jun. 30, 1992

[54] RADIAL AND AXIAL FLOW FILTER DEVICE

[75] Inventors: Edward C. Giordano, Manchester; Raymond M. Petrucci, Middlebury; Mark O'Brien, Glastonbury, all of Conn.

[73] Assignee: Cuno, Incorporated, Meriden, Conn.

[21] Appl. No.: 422,519

[22] Filed: Oct. 17, 1989

[51] Int. Cl.⁵ ............................................. B01D 27/08
[52] U.S. Cl. ..................................... 210/249; 210/282;
210/287; 210/314; 210/321.88; 210/451;
210/497.01
[58] Field of Search ............... 210/249, 264, 282, 287,
210/314, 321.79, 321.88, 437, 451, 489, 497.1,
500.23, 510.1, 652, DIG. 13

[56] References Cited

U.S. PATENT DOCUMENTS

| D. 162,118 | 2/1951 | Bausenbach | D58/1 |
|---|---|---|---|
| D. 212,417 | 10/1968 | Glover | D23/3 |
| D. 215,000 | 8/1969 | Young | D23/3 |
| D. 253,422 | 11/1979 | Smith | D23/4 |
| D. 282,561 | 2/1986 | Lu | D23/2 |
| 2,766,890 | 7/1949 | Kasten | 210/183 |
| 2,960,234 | 11/1960 | Frederickson | 210/457 |
| 3,105,042 | 9/1963 | Roosa | 210/94 |
| 3,132,501 | 5/1964 | Jacobs et al. | 68/18 |
| 3,144,407 | 8/1964 | Olmos | 210/307 |
| 3,390,778 | 7/1968 | Uhen, Jr. | 210/314 |
| 3,465,883 | 9/1969 | Jumper . | |
| 3,561,602 | 2/1971 | Molitor . | |
| 3,586,171 | 6/1971 | Offer . | |
| 3,975,273 | 8/1976 | Shaltz et al. | 210/314 |
| 4,070,292 | 1/1978 | Adams | 210/195 |
| 4,094,791 | 6/1978 | Conrad . | |
| 4,411,791 | 10/1983 | Ward | 210/437 |
| 4,476,019 | 10/1984 | Nowisch et al. | 210/249 |
| 4,711,723 | 12/1987 | Bray | 210/652 |
| 4,753,728 | 6/1988 | Vanderbilt et al. | 210/282 |
| 4,828,698 | 5/1989 | Jewell et al. | 210/266 |
| 4,842,724 | 6/1989 | Bray et al. | 210/104 |
| 4,859,386 | 8/1989 | Vanderbilt et al. | 264/113 |

FOREIGN PATENT DOCUMENTS 0335571 3/1989 European Pat. Off. .

Primary Examiner—Robert A. Dawson
Assistant Examiner—Wanda L. Millard
Attorney, Agent, or Firm—Renner, Kenner, Greive, Bobak, Taylor & Weber

[57] ABSTRACT

A filter device for use in a domestic or office water supply system is provided. The device includes a container having an enclosed cavity, and includes a filter unit disposed in the cavity. The device is a two-stage device having a first radial flow filter subassembly and a second axial flow filter subassembly. The radial flow subassembly includes a radially inner perforated tube, a carbon block cylinder over the tube, prefilter cylinders over the carbon block cylinder, and a screen-like wrap layer over the radially outer second prefilter cylinder. The axial flow subassembly has a plurality of axial filter fiber tubes which have a support header wall. The header wall is mounted in a cup-shaped member. The cup-shaped member has a plurality of outlet passage slots at the closed end thereof and supports the header wall at the other end thereof.

11 Claims, 2 Drawing Sheets

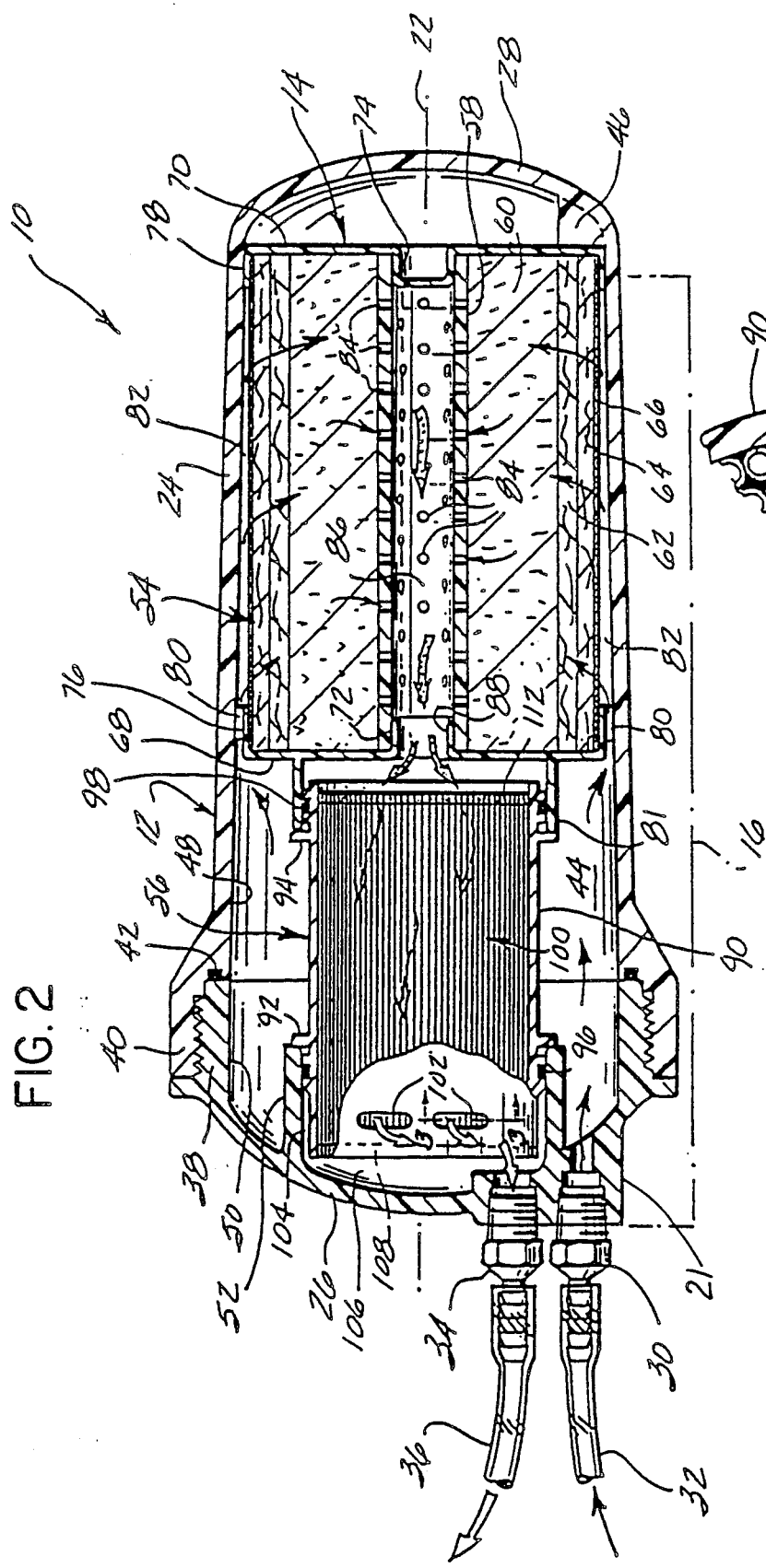
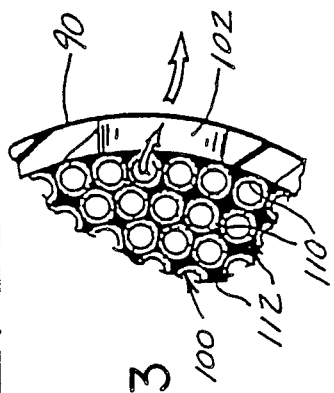
FIG. 2
FIG. 3

RADIAL AND AXIAL FLOW FILTER DEVICE

This invention relates to a filter device, and in particular, a two-stage filter device having a first radial flow filter stage and a nested second axial flow filter stage with serial fluid flow passages.

BACKGROUND OF THE INVENTION

Field of the Invention

A prior art filter device is described in U.S. Pat. No. 3,390,778, to Uhen. This filter device includes a container having an inlet opening and an outlet opening and includes a filter unit having a first stage radial flow filter subassembly and having a second stage radial flow filter subassembly. A problem associated with this filter device is that the fluid flow has a relatively excessive number of right angle turns for fluid flow from the inlet opening to the outlet opening, with a resultant head loss.

Other relevant U.S. Pat. Nos. are:

Kasten, 2,766,890, teaches a two-stage fluid demulsifier to separate water droplets from an emulsified liquid using pleated cylindrically-shaped filter paper impregnated with a resinous material to make it resistant to water, gasoline or kerosene and the like, and a fine fibrous mass of material such as fiberglass contained between a perforated metal or wire screen. In operation, the fluid passes radially through both filters. Contaminant seeps downwardly into a contaminant chamber, to be withdrawn from the filter through an outlet. The filter chambers are separated by an annular partition held by bolts. Purified liquid passes upwardly and exits through the outlet.

Fredrickson, 2,960,234, teaches a two-stage water separator. The second stage of the separator has a cartridge which has a previous cylindrical wall which provides support for an external paper separator sheet with puckers throughout which approximately double the amount of paper in a given area. The first compartment has a coalescer cartridge. The compartments are separated by a partition or wall. Flow is radial, i.e., from the outside-in, for each cartridge.

Roosa, 3,105,042, teaches a two-stage liquid fuel filter assembly. In FIG. 4, two identical filter cartridges are axially stacked, each filter having an appropriate filter material, such as a wound cotton cord type. In operation, fluid flows downwardly through the center passageway and then through the lower filter cartridge and then up through the upper filter cartridge and out. In FIG. 5, the lower filter cartridge is a radial flow type filter. In operation, fluid flows downwardly through central passageway and proceeds radially through the lower filter, then upwardly through a large central opening and then flows through the upper filter cartridge. The filter cartridges of the assembly are not replaceable.

Jacobs, et al., 3,132,501, shows in FIG. 5 a dry-cleaning filter assembly having replaceable filter cartridges having a first felt filter stage for removing particulate matter from a dry-cleaning solvent, and a second annular carbon filter for adsorbing dyes and a third annular folded cellulosic filter. As shown by the fluid flow arrows of FIG. 5, fluid passes in through conduit 94, flows downwardly then radially through first filter stage and flows into chamber 160,162 and radially through the second and third filter stage and through opening 168 and out. The filter elements are removable.

Olmos, 3,144,407, teaches a separator for removing moisture from gasoline, and other hydrocarbon liquids, having a first filter cartridge with an outer annular pleated filter paper element and an inner soft batt formed of glass fibers and a second filter cartridge with cylindrical pleated paper coated with phenol formaldehyde to stiffen the paper and silicone to make it water repellant. The filter cartridges are removably secured in the housing. In operation, fluid flows down a center pipe and then radially through the first filter, upwardly and then radially through the second filter and out.

Jumper, 3,465,883, teaches a two-stage fuel water separator and filter, having a first coalescer (FIG. 2) composed of hydrophilic material, e.g. fiberglass and molded into a ring shape and a second separator (FIG. 3) composed of treated filter paper. In operation, fuel passes and flows radially through the coalescer, downwardly through a passageway, and flows radially through the separator and passes out.

Molitor, 3,561,602, teaches a liquid filter, having a first filter element composed of a stack of absorbent cloth discs as shown (FIG. 3) which are saturated with potassium permanganate for dissolving and removing iron from the water, and a second charcoal granular filter for removing odors and the like from the water. In operation, water flows into supply pipe 14 into a lower cylindrical chamber, flows radially through the first filter and then through slots of the central tube, upwardly through the tube and axially through the charcoal filter and out. When the potassium permanganate supply in the first filter becomes exhausted, the filter elements may be replaced with a new element, or the disc filter elements may be re-impregnated by adding an amount of potassium permanganate.

Offer, 3,586,171, teaches a dual-flow, two-stage oil filter. A first filter element is a depth-type filter made from viscose rayon or other synthetic fiber coated with resin and bonded together by heating and curing in a compression mold. A second filter element is made from a fine flow paper. In operation, oil flows radially through both filter elements, with the first filter element excluding particles above 80 microns in size and the second filter element excluding particles above 10 microns in size.

Shaltz, et al., 3,975,273, discloses a two-stage oil filter, having a first depth-type filter media consisting of rayon fibers and a binder and a second surface-type filter media made of spirally wound crepe filter paper. In operation, oil flows in parallel through the filters by passing radially through depth-type filter which removes all solid particles above 90 microns and then through a surface-type filter 30 which removes even smaller solid particles.

Conrad, 4,094,791, teaches an oil filter, having a main flow filter insert and an auxiliary flow filter insert, removable, and replaceable.

SUMMARY OF THE INVENTION

According to the present invention, a filter device is provided. This filter device comprises a container having a longitudinal axis and having a peripheral wall and a first end wall and a second end wall enclosing a cavity and having an inlet opening and an outlet opening, and comprises a filter unit disposed in the cavity and having a first radial flow filter subassembly and having a second axial flow filter subassembly nested in the first radial flow filter subassembly at an end thereof.

By using a second axial flow filter subassembly nested in a first radial flow filter subassembly, the problem of having a relatively excessive number of right angle turns of the fluid flow, and resulting head loss, is avoided.

The foregoing and other objects, features and advantages will be apparent from the following description of the preferred embodiment of the invention as illustrated on the accompanying drawings.

BRIEF DESCRIPTION OF THE DRAWINGS

FIG. 2 is a section view as taken along line 2—2 of FIG. 1; and

FIG. 3 is a section view as taken along line 3—3 of FIG. 2.

DESCRIPTION OF THE PREFERRED EMBODIMENT

Figure 1:
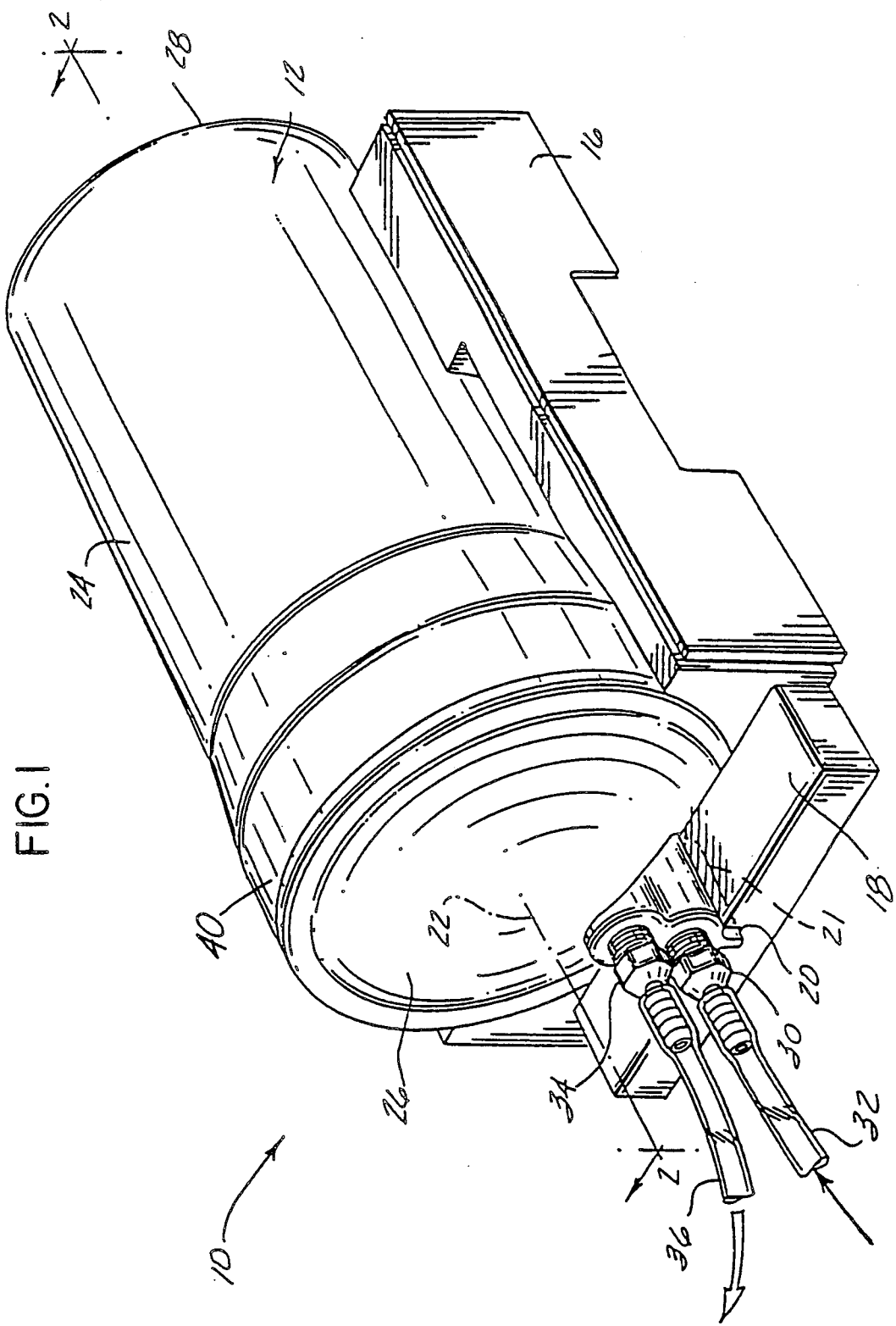
FIG. 1 is a perspective view of a filter devise according to the present invention.

As shown in FIG. 1, a filter device or apparatus 10 is provided. Device 10 includes a housing or container 12, a filter assembly 14, which is disposed inside container 12, and a cradle structure 16, which supports container 12.

Cradle 16 has an end cross-beam 18, which has a slot 20. Slot 20 receives a projection 21 of container 12 in order to prevent turning of container 12 relative to cradle 16.

Referring to FIG. 2, container 12 has a longitudinal axis 22, and has a peripheral wall 24, a left end wall 26, and a right end wall 28. End walls 26,28 are dome-shaped, and are also axially spaced along axis 22.

Left end wall 26 has an inlet fitting 30, a tube 32 connected to inlet fitting 30, an outlet fitting 34, and a tube 36 connected to fitting 34. Inlet fitting 30 is disposed radially outwardly of outlet fitting 34. Tubes 32 and 36 may be connected to a faucet connector which provides inlet flow to the filter device and permits outlet flow (not shown).

Left end wall 26 has a threaded projecting portion 38, which projects axially inwardly. Peripheral wall 24 has an oppositely facing threaded projecting portion 40, which receives and is threaded over portion 38. Peripheral wall 24 also has an O-ring or seal ring 42, which is disposed adjacent to threaded portions 38,40, and which bears against peripheral wall 24 and end wall 26 at the ends thereof.

Right end wall 28 is fixedly connected to peripheral wall 24. Walls 24,26,28 enclose a cavity or chamber 44. Right end wall 28 has a step portion 46, which faces chamber 44.

Peripheral wall 24 has a radially inner surface 48. Surface 48 is slightly tapered and has a frusto-conical shape. Threaded portion 38 also has a radially inner surface 50, which lines up and is flush with an adjacent portion of surface 48. Left end wall 26 has a cylindrical extension 52, which projects axially inwardly into chamber 44.

Filter assembly 14, which is a two-piece assembly, is supported in an axial direction by step 46 at one end thereof and by extension 52 at the other end thereof. Filter assembly 14 is supported in a radial direction by peripheral wall 24 and by extension 52.

Filter assembly 14 includes a first stage radial flow subassembly 54 and a second stage axial flow subassembly 56.

In the embodiment depicted, subassembly 54 includes a carbon block cylinder 60, for reducing organic chemicals, "off tastes" and odors; a post filter porous sintered polyethylene tube 58, for retaining carbon particles. Subassembly 54 also includes a spirally wrapped inner lead (soluble and insoluble) removing prefilter member 62 and 64, and a prefilter porous layer or screen 66 wrap for reducing coarse sediment.

Filter 60 is disposed radially outwardly of tube 58. Prefilter 62 and 64 are disposed radially outwardly of filter 60. Wrap 66 is disposed radially outwardly of prefilter 64.

Subassembly 54 also includes a left solid end cap 68 and a right solid end cap 70. Left end cap 68 has an open inner cylinder 72. Right end cap 70 has a closed inner cylinder 74. Cylinders 72,74 support the tube 58. Left end cap 68 also has an outer return bend cylindrical portion 76, which overlaps wrap 66. Right end cap 70 also has an outer return bend cylindrical portion 78, which overlaps wrap 66.

Cylindrical portion 76 has a plurality of peripherally spaced spacers or fins 80, which center left end cap 68, and which allow fluid flow between the fins 80. Left end cap 68 also has a cylindrical projection 81, which projects axially outwardly and which overlaps and nests subassembly 56 at an end thereof.

Subassembly 54 forms an annular space or passage 82 of tapered thickness, for fluid flow radially inwardly through wrap 66, then through prefilters 64,62, then through carbon block filter 60, and then through tube 58. Tube 58 has a plurality of holes 84, for fluid flow through tube 58, then through a passage or space 86 within tube 58. Left end cap 68 has a central hole 88, which is disposed radially inwardly of cylinder 72, for fluid flow from passage 86 then through hole 88 and then through subassembly 56. The size of holes 84 are exaggerated in the drawing for ease of illustration.

Subassembly 56 includes an open-ended molded plastic hollow shell element 90. Shell 90 has a left bearing shoulder ring 92 and has a right bearing shoulder ring 94. Shoulders 92,94 project radially outwardly and bear respectively against extension 52 and projection 81.

Shell 90 has a left seal ring or O-ring 96 and has a right seal ring or O-ring 98. Seal rings 96,98 prevent fluid flow to the radially outer side of shell 90 from hole 88. Fluid flow from hole 88 passes only on the radially inner side of shell 90.

Shell 90 contains an axial filter unit 100 Unit 100 is a hollow fiber type of filter unit. Fluid flow passes from hole 88, then through filter unit 100.

Referring to FIGS. 2 and 3, shell 90 also has a plurality of peripherally spaced slots 102 near the left end thereof. Fluid flows through filter unit 100, then through slots 102.

Shell 90 forms an annular passage or space 104, which is disposed axially outwardly of seal ring 96, for fluid flow through slots 102, then through passage 104, and then through an outlet passage or space 106 to fitting 34 and tube 36.

Filter unit 100 includes a left dead end thin solid wall portion 108, which prevents fluid flow therethrough. Preferably this is a potting material.

As shown in FIG. 3, filter unit 100 has a plurality of thin porous tubes or hollow cylindrical fibers 110. Fluid flow passes axially through the insides of tubes 110 and through the porous walls thereof. Filter unit 100 also has a right thin partition or header wall 112, through which tubes 110 extend preventing fluid flow around tubes 110. Preferably this is a potting material which surrounds the ends of tubes 110. Fluid flow passes from inside tubes 110, through the walls thereof to the spaces between tubes 110, then out through slots 102 to passage 104.

Container 12 is preferably composed of a plastic or polymeric material. Post filter 58 is also preferably composed of a polymeric material, such as polyethylene. Filter 60 is composed of a carbon material, preferably activated carbon with a polyolefin binder. Prefilters 62,64 are composed of a lead-removing media. Wrap layer 66 is composed of a screen-like plastic netting, e.g. polypropylene, material. Ring seals 42,96,98 are composed of an elastomeric material. Partition and walls 112 and 108 are composed of a polymeric material. Fibers or tubes 110 are composed of microporous tubes of about a five-millimeter diameter size. Cradle 16 is composed of a polymeric structural material.

In operation, the fluid or water stream which is indicated by the arrows, flows radially through first filter subassembly 54 to center passage 86, then flows axially back through second filter subassembly 56.

Shell 90 and O-ring 96,98 separate and seal off the outer inflow from the inner outflow.

In FIGS. 1,2 and 3, the arrows indicate the direction of fluid flow. The dark arrows indicate contaminated fluid, beginning at the inlet tube 32, and through filters 64,62,60,58. The dark arrows then turn to white arrows with stipples or stippled hatching. The stippled arrows leave the first filter stage 54 and enter filter 100 of the second filter stage 56. The stippled arrows turn to clear white arrows as the fluid flows out through slots 102 and passes out through outlet fitting 34.

Filter subassembly 56 is nested in the end of filter subassembly 58. Subassemblies 56,58 can be replaced or cleaned by disassembling peripheral wall 24 from left end wall 26.

This invention provides:

A) A two-stage filter device 10, which has a first radial flow filter subassembly 54 and a second axial flow filter subassembly 56, thereby minimizing the number of right angle turns of the fluid flow, and resultant head loss.

B) A two-stage filter device 10, which has filter subassemblies 54,56, arranged in series, for avoiding parallel fluid flows.

C) A two-stage filter device 10, which has an inlet 30 and an outlet 34 that are disposed in one end wall 26, for ease of twist-off and disassembly of container 12 and connection to, for example, a water faucet.

D) A two-stage filter device 10, which has separate and individual filter subassemblies 54,56, for replacement of either one or both subassemblies 54,56, as desired.

E) A two-stage filter device 10, which has nested first and second filter subassemblies 54,56, that have a leak-proof, flexure-resistant interconnection 81,94,98, for ease of support by container end walls 26,28.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A filter device comprising:
   a container having a longitudinal axis and a peripheral wall and a first end wall and a second end wall enclosing a cavity and having an inlet opening and an outlet opening to said cavity; and
   a filter unit disposed in the cavity comprising a first radial flow filter subassembly and a second axial flow filter subassembly in series with a cylindrical shell nested in said first radial flow filter subassembly at an end thereof in peripheral sealing relation thereto for effecting series flow through said first radial flow filter subassembly then sequentially through said second axial flow filter subassembly.

2. The device of claim 1, wherein
   said first radial flow subassembly is disposed adjacent to the second end wall;
   said second radial flow subassembly is disposed adjacent to the first end wall;
   said first radial flow subassembly and said second axial flow subassembly having an overlapping nesting interconnection and being coaxial;
   said first radial flow subassembly and said second axial flow subassembly having an elongate cylindrical axial flow passage on the radially outer sides thereof for fluid flow from the inlet opening to the first radial flow subassembly;
   said first radial flow subassembly having a central axial passage with an outlet hole for fluid flow from the elongate axial flow passage then through the first radial flow subassembly then back through central axial passage then through the outlet hole to the second axial flow subassembly.

3. The device for claim 2, wherein the first radial flow subassembly comprises:
   a radially inner perforated tube;
   a carbon block filter cylinder disposed over the tube;
   a prefilter disposed over the carbon block filter cylinder; and
   a radially outer porous wrap disposed over the prefilter cylinders.

4. The device of claim 1, wherein
   said filter subassemblies are spaced radially inwardly of said peripheral wall of said container, thereby forming an annular passage therebetween.

5. The device of claim 4, wherein
   said annular passage extends from said first end wall to said second end wall of said container.

6. The device of claim 1, wherein
   said first radial flow filter subassembly has a cylindrical projection which overlaps said cylindrical shell of said second axial flow filter subassembly;
   and sealing means interposed between said cylindrical projection and said cylindrical shell.

7. The device of claim 1, wherein
   both said inlet opening and said outlet opening to said cavity are disposed in one of said end walls.

8. A filter device comprising:
   a container having a longitudinal axis and a peripheral wall and a first end wall and a second wall enclosing cavity and having an inlet opening and an outlet opening to said cavity;
   a cradle for supporting the container, said cradle having a cross-beam with a slot for engaging a portion of the container for preventing twisting of the container about the axis thereof; and
   a filter unit disposed in the cavity comprising a first radial flow filter subassembly and a second axial flow filter subassembly in series with a cylindrical shell nested in said first radial flow filter subassembly at an end thereof in peripheral sealing relation thereto for effecting series flow through said first radial flow filter subassembly then sequentially through said second axial flow filter subassembly.

9. A filter device comprising:

a container having a longitudinal axis and a peripheral wall and a first end wall and a second end wall enclosing a cavity and having an inlet opening and an outlet opening to said cavity; and a filter unit disposed in the cavity and having a first radial flow filter subassembly and having a second axial flow filter subassembly nested in the first radial flow filter subassembly at an end thereof, said first radial flow subassembly being disposed adjacent to the second end wall;

said second axial flow subassembly being disposed adjacent to the first end wall;

said first radial flow subassembly and said second axial flow subassembly having an overlapping nesting interconnection and being coaxial;

said first radial flow subassembly and said second axial flow subassembly having an elongate cylindrical axial flow passage on the radially outer sides thereof for fluid flow from the inlet opening to the first radial flow subassembly;

said first radial flow subassembly having a central axial passage with an outlet hole for fluid flow from the elongate axial flow passage then through the first radial flow subassembly then back through central axial passage then through the outlet hole to the second axial flow subassembly;

said second axial flow subassembly having a cup-shaped structural shell member having a first solid end wall and having a plurality of peripherally spaced slots;

a second header end wall having a plurality of holes;

a plurality of porous hollow fiber tuber respectively extending through the header wall holes;

said fiber tubes having respective axial passages for fluid flow from the central axial passage and outlet hole of the first radial flow subassembly, then through the axial passages of the fiber tubes, then out of said fiber tubes, then through said slots, to an outlet space adjacent to said outlet opening.

10. A filter device comprising:

a container having a longitudinal axis and a peripheral wall and a first end wall and a second end wall enclosing a cavity and having an inlet opening and an outlet opening to said cavity; and a filter unit disposed in the cavity and having a first radial flow filter subassembly and a second axial flow filter subassembly in series with a cylindrical shell nested in said first radial flow filter subassembly at an end thereof in peripheral sealing relation thereto for effecting series flow through said first radial flow filter subassembly then sequentially through said second axial flow filter subassembly wherein said filter subassemblies are spaced radially inwardly of said peripheral wall of said container, thereby forming an annular passage therebetween; and wherein said peripheral wall of said container tapers radially inwardly to a step which engages said first radial flow filter subassembly.

11. A filter device comprising:

a container having a longitudinal axis and a peripheral wall and a first end wall and a second end wall enclosing a cavity and having an inlet opening and an outlet opening to said cavity; and a filter unit disposed in the cavity and having a first radial flow filter subassembly and a second axial flow filter subassembly in series with a cylindrical shell nested in said first radial flow filter subassembly at an end thereof in peripheral sealing relation thereto for effecting series flow through said first radial flow filter subassembly then sequentially through said second axial flow filter subassembly wherein said filter subassemblies are spaced radially inwardly of said peripheral wall of said container, thereby forming an annular passage therebetween; wherein said filter unit is supported between said first end wall and said second end wall; and a plurality of peripherally spaced fins supporting said filter unit within said container intermediate said first end wall and second end wall.

* * * * *